(12) United States Patent
Amsterdam et al.

(10) Patent No.: US 8,275,245 B2
(45) Date of Patent: Sep. 25, 2012

(54) REPLACE CONTENT WITH LIKE CONTENT TO ENHANCE PROGRAM EXPERIENCE

(75) Inventors: Jeffrey D. Amsterdam, Marietta, GA (US); Kulvir S. Bhogal, Pflugerville, TX (US); Gregory J. Boss, Saginaw, MI (US); Rick A. Hamilton, II, Charlottesville, VA (US); Brian M. O'Connell, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 12/792,224

(22) Filed: Jun. 2, 2010

(65) Prior Publication Data

US 2011/0299836 A1  Dec. 8, 2011

(51) Int. Cl.
H04N 5/76 (2006.01)
H04N 5/445 (2006.01)
G06F 13/00 (2006.01)
G06F 3/00 (2006.01)
H04N 7/173 (2006.01)

(52) U.S. Cl. ........ 386/294; 386/291; 386/292; 386/293; 386/295; 386/297; 386/299; 725/37; 725/39; 725/46; 725/56; 725/58; 725/60; 725/61; 725/86; 725/97; 725/101

(58) Field of Classification Search .................. 386/291, 386/292, 293, 294, 295, 297, 299; 725/37, 725/39, 46, 56, 58, 60, 61, 86, 97, 101
See application file for complete search history.

(56) References Cited

U.S. PATENT DOCUMENTS

| | | | |
|---|---|---|---|
| 7,212,730 B2 | 5/2007 | Boston et al. | |
| 7,248,776 B2 * | 7/2007 | Boston et al. | 386/295 |
| 7,254,318 B2 * | 8/2007 | Imada et al. | 386/329 |
| 7,543,322 B1 | 6/2009 | Bhogal et al. | |
| 7,568,079 B2 * | 7/2009 | Horiuchi et al. | 711/159 |
| 7,665,111 B1 * | 2/2010 | Barton et al. | 725/58 |
| 7,840,112 B2 * | 11/2010 | Rao | 386/291 |
| 7,869,688 B2 * | 1/2011 | Umei et al. | 386/241 |
| 2003/0067554 A1 * | 4/2003 | Klarfeld et al. | 348/461 |
| 2003/0108331 A1 * | 6/2003 | Plourde et al. | 386/83 |
| 2004/0109668 A1 * | 6/2004 | Stuckman | 386/40 |
| 2006/0062542 A1 * | 3/2006 | Sakuma | 386/46 |
| 2006/0140584 A1 * | 6/2006 | Ellis et al. | 386/83 |
| 2006/0153014 A1 * | 7/2006 | Higgins | 369/30.01 |
| 2006/0167903 A1 | 7/2006 | Smith et al. | |
| 2007/0245024 A1 * | 10/2007 | Prus et al. | 709/226 |
| 2009/0257733 A1 * | 10/2009 | Ellis | 386/83 |

(Continued)

OTHER PUBLICATIONS

Berrani, S. et al; "TV Broadcast Macro-Segmentation: Metadata-Based vs. Content-Based Approaches"; CIVR'07; Jul. 2007; pp. 325-332.

(Continued)

*Primary Examiner* — Daquan Zhao
(74) *Attorney, Agent, or Firm* — Brown & Michaels, PC (57) ABSTRACT

A method and a system for replacement of programs on a video recorder based on preferences and size constraints of a video recorder. The video recorder compares recorded programs in the computer readable storage media and a schedule of programs to be recorded to a plurality of global preferences and program specific preferences specifying preferred recording quality. For each recorded program whose quality does not match a global preference or program specific preference, a listing of future programs is examined for alternate versions of the program which do match a global preference or program specific preference.

10 Claims, 6 Drawing Sheets

U.S. PATENT DOCUMENTS

2010/0037269 A1* 2/2010 Hayashi .......................... 725/58
2010/0131983 A1* 5/2010 Shannon et al. ................. 725/46

OTHER PUBLICATIONS

Narasimhan, N. et al; "TV Clips—Using Social Bookmarking for Content Discovery in a Fragmented TV Ecosystem"; MUM 2009; 8 pages.

Brassil, J. et al.; "Structuring Internet Media Streams with Cueing Protocols"; IEE/ACM Transactions on Networking. vol. 10; No. 4; Aug. 2002; pp. 466-476.

SD/HD/Both option setting for wishlists—TiVo Community; http://www.tivocommunity.com/tivo-vb/showthread.php?t=392293; 7 pages.

* cited by examiner

REPLACE CONTENT WITH LIKE CONTENT TO ENHANCE PROGRAM EXPERIENCE

BACKGROUND OF THE INVENTION

The present invention relates to digital video recorders, and more specifically to replacing recorded programs with different versions based on criteria specified by a user.

A digital video recorder (DVR) or personal video recorder (PVR) is a device that records video in a digital format to a disk drive or other medium. The term includes stand-alone set-top boxes and software for personal computers which enables video capture and playback to and from disk.

Air television broadcasts are moving to an all high-definition (HD) format, and cable and satellite maintain a dual system of channels that includes standard-definition (SD) and high-definition (HD) formats. Most channels are available in both standard-definition and high-definition formats. Currently, if a user records a show or a series of shows for a channel, and the channel chosen is an SD channel, then the show is recorded in SD. If the channel chosen is an HD channel, then the program is recorded in HD. If a user mistakenly selects an SD channel when an HD channel was intended; when a user can only find an SD version of a program in the program guide; or when if a DVR is running out of space due to the number of HD programs recorded, there is no automatic solution to switch between the different formats. Instead, the user has to manually delete programs or manually store and locate different versions of a program.

SUMMARY OF THE INVENTION

According to one embodiment of the present invention, a method and a system for replacement of programs on a video recorder having a computer readable storage media is disclosed. The video recorder compares recorded programs in the computer readable storage media and a schedule of programs to be recorded to a plurality of global preferences and program specific preferences specifying preferred recording quality. For each recorded program whose quality does not match a global preference or program specific preference, a listing of future programs is examined for alternate versions of the program which do match a global preference or program specific preference. If an alternate version of the program which does match a global preference or program specific preference exists, then an alternate version of the originally recorded program to be recorded is scheduled. When the alternate version of the program is recorded, the originally recorded program is deleted. For each scheduled program whose quality does not match a global preference or program specific preference, a listing of future programs is examined for alternate versions of the program which do match a global preference or program specific preference. If an alternate version of the program which does match a global preference or program specific preference exists which will air before the scheduled program, then the scheduled program is replaced with the alternate version of the scheduled program. If an alternate version of the program which does match a global preference or program specific preference exists which will air after the scheduled program, then a notification is sent to a user of availability of alternate version of the program.

According to another embodiment of the present invention, a method and a system for program content replacement of programs to be recorded and that have already been recorded on a video recorder having a computer readable storage media is disclosed. The video recorder estimates a total size for scheduled recordings and compares the total size of scheduled recordings to available space on the computer readable storage media. If the total size of the scheduled recordings is greater than the available space on the computer readable storage media, then a high quality recording in the computer readable storage media is examined to determine whether the high quality recording may be replaced by a lower quality recording based on stored preferences. If the high quality recording may be replaced based on the stored preferences, a listing of future programs are examined for lower quality versions of the program, and if a lower quality version of the program is available, the lower quality version is scheduled for recording; and the higher quality broadcast recording is deleted after the lower quality version has been recorded. Then the available space after replacement of the high quality recording with the lower quality version is calculated and the total size of scheduled recordings is compared to available space on the computer readable storage media. The high quality recordings are examined, until all the high quality recordings have been examined, or the total size of the scheduled recordings is less than the available space.

DETAILED DESCRIPTION OF THE INVENTION

Figure 1:
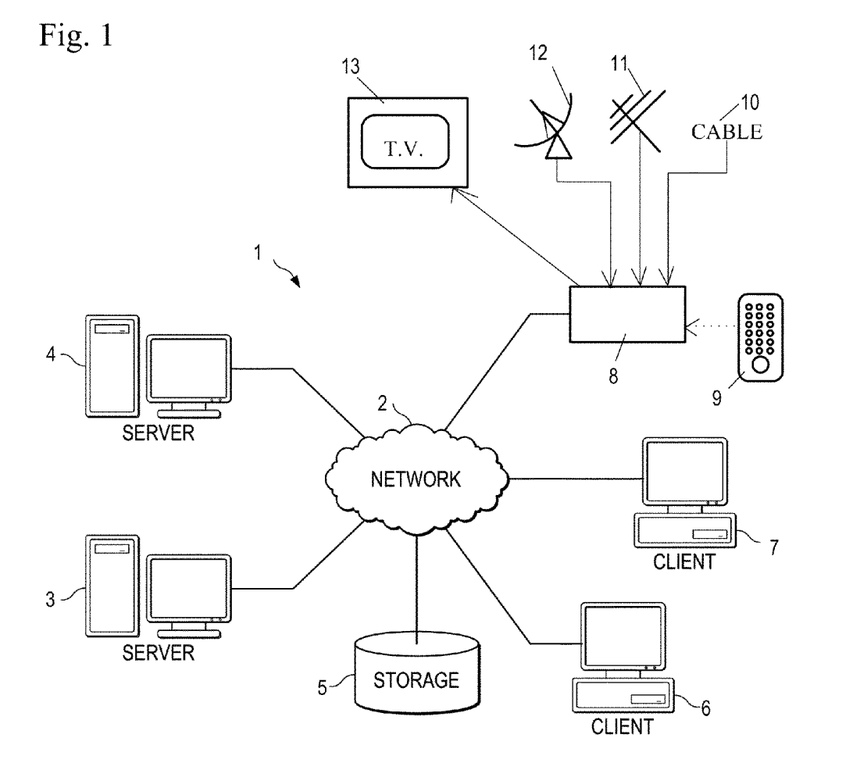
FIG. 1 is a computer network in which illustrative embodiments may be implemented.
Figure 2:
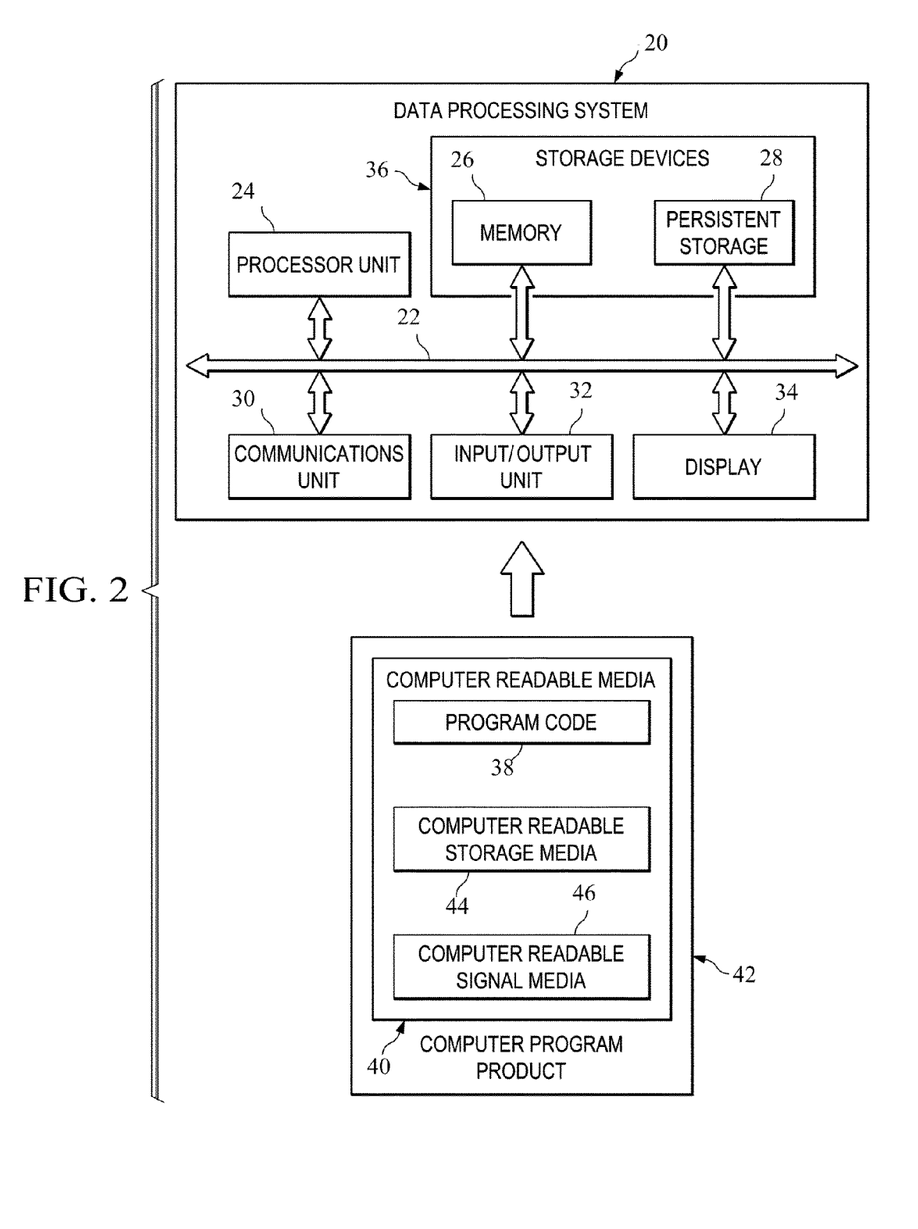
FIG. 2 is a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 1 is a network of computers in which the illustrative embodiments may be implemented. Network data processing system 1 contains network 2, which is the medium used to provide communication links between various devices and computers connected together within network data processing system 1. Network 2 may include connections, such as wire, wireless communication links, or fiber optic cables.

In the depicted example, server 3 and server 4 connect to network 2 along with storage unit 5. In addition, clients 6, 7, and 8 connect to network 2. Clients 6 and 7 may be, for example, personal computers, network computers, or other portable devices. Client 8 may be, for example a digital video recorder which may be connected to cable 10, a television antenna 11, and/or satellite 12 to receive a signal from a broadcasting network that is displayed on a television (T.V.) 13 connected to the client 8. A universal remote 9 may be used to interact with the client 8. The other clients 6 and 7 may also be used to interact with the client 8. In the depicted example, server 3 provides information, such as boot files, operating system images, and applications to clients 6, 7, and 8. Clients 6, 7, and 8 are clients to server 3 in this example. Network data processing system 1 may include additional servers, clients, and other devices not shown.

Program code or television broadcasts located in network data processing system 1 may be stored on a computer recordable storage medium and downloaded to a data processing system or other device for use. For example, program code may be stored on a computer recordable storage medium on server 4 and downloaded to client 8 over network 2 for use on client 8.

In the depicted example, network data processing system 1 is the a local area network (LAN) with network 2 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1 also may be implemented as a number of different types of networks, such as, for example, an intranet, Internet, or a wide area network (WAN). FIG. 1 is intended as an example, and not as an architectural limitation, for the different illustrative embodiments.

With reference now to FIG. 2, a block diagram of a data processing system is shown in which illustrative embodiments may be implemented. Data processing system 20 is an example of a computer, such as server 3 or client 8 in FIG. 1, in which computer usable program code or instructions implementing the processes may be located for the illustrative embodiments. In this illustrative example, data processing system 20 includes communications fabric 22, which provides communications between processor unit 24, memory 26, persistent storage 28, communications unit 30, input/output (I/O) unit 32, and display 34.

Processor unit 24 serves to execute instructions for software that may be loaded into memory 26. Processor unit 24 may be a set of one or more processors, or may be a multiprocessor core, depending on the particular implementation. Further, processor unit 24 may be implemented using one or more heterogeneous processor systems in which a main processor is present with secondary processors on a single chip. As another illustrative example, processor unit 24 may be a symmetric multi-processor system containing multiple processors of the same type.

Memory 26 and persistent storage 28 are examples of storage devices 36. A storage device is any piece of hardware that is capable of storing information, such as, for example, without limitation, data, program code in functional form, and/or other suitable information either on a temporary basis and/or a permanent basis. Memory 26, in these examples, may be, for example, a random access memory or any other suitable volatile or non-volatile storage device. Persistent storage 28 may take various forms depending on the particular implementation. For example, persistent storage 28 may contain one or more components or devices. For example, persistent storage 28 may be a hard drive, a flash memory, a rewritable optical disk, a rewritable magnetic tape, or some combination of the above. The media used by persistent storage 28 also may be removable. For example, a removable hard drive may be used for persistent storage 28.

Communications unit 30, in these examples, provides for communications with other data processing systems or devices. In these examples, communications unit 30 is a network interface card. Communications unit 30 may provide communications through the use of either or both physical and wireless communication links.

Input/output unit 32 allows for input and output of data with other devices that may be connected to data processing system 20. For example, input/output unit 32 may provide a connection for user input through a keyboard, a mouse, and/or some other suitable input device. Further, input/output unit 32 may send output to a printer. Display 34 provides a mechanism to display information to a user.

Instructions for the operating system, applications, and/or programs may be located in storage devices 36, which are in communication with processor unit 24 through communications fabric 22. In these illustrative examples the instructions are in a functional form on persistent storage 28. These instructions may be loaded into memory 26 for running by processor unit 24. The processes of the different embodiments may be performed by processor unit 24 using computer implemented instructions, which may be located in a memory, such as memory 26.

These instructions are referred to as program code, computer usable program code, or computer readable program code, that may be read and run by a processor in processor unit 24. The program code in the different embodiments may be embodied on different physical or tangible computer readable media, such as memory 26 or persistent storage 28.

Program code 38 is located in a functional form on computer readable media 40 that is selectively removable and may be loaded onto or transferred to data processing system 20 for running by processor unit 24. Program code 38 and computer readable media 40 form computer program product 42 in these examples. In one example, computer readable media 40 may be in a tangible form, such as, for example, an optical or magnetic disc that is inserted or placed into a drive or other device that is part of persistent storage 28 for transfer onto a storage device, such as a hard drive that is part of persistent storage 28. In a tangible form, computer readable media 40 also may take the form of a persistent storage, such as a hard drive, a thumb drive, or a flash memory that is connected to data processing system 20. The tangible form of computer readable media 40 is also referred to as computer recordable storage media. In some instances, computer readable media 40 may not be removable.

Alternatively, program code 38 may be transferred to data processing system 20 from computer readable media 40 through a communications link to communications unit 30 and/or through a connection to input/output unit 32. The communications link and/or the connection may be physical or wireless in the illustrative examples. The computer readable media also may take the form of non-tangible media, such as communication links or wireless transmissions containing the program code.

In some illustrative embodiments, program code 38 may be downloaded over a network to persistent storage 28 from another device or data processing system for use within data processing system 20. For instance, program code stored in a computer readable storage medium in a server data processing system may be downloaded over a network from the server to data processing system 20. The data processing system providing program code 38 may be a server computer, a client computer, or some other device capable of storing and transmitting program code 38.

The different components illustrated for data processing system 20 are not meant to provide architectural limitations to the manner in which different embodiments may be implemented. The different illustrative embodiments may be implemented in a data processing system including components in addition to, or in place of, those illustrated for data processing system 20. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 20 is any hardware apparatus that may store data. Memory 26, persistent storage 28 and computer readable media 40 are examples of storage devices in a tangible form.

In another example, a bus system may be used to implement communications fabric 22 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 26 or a cache such as found in an interface and memory controller hub that may be present in communications fabric 22.

Figure 3:
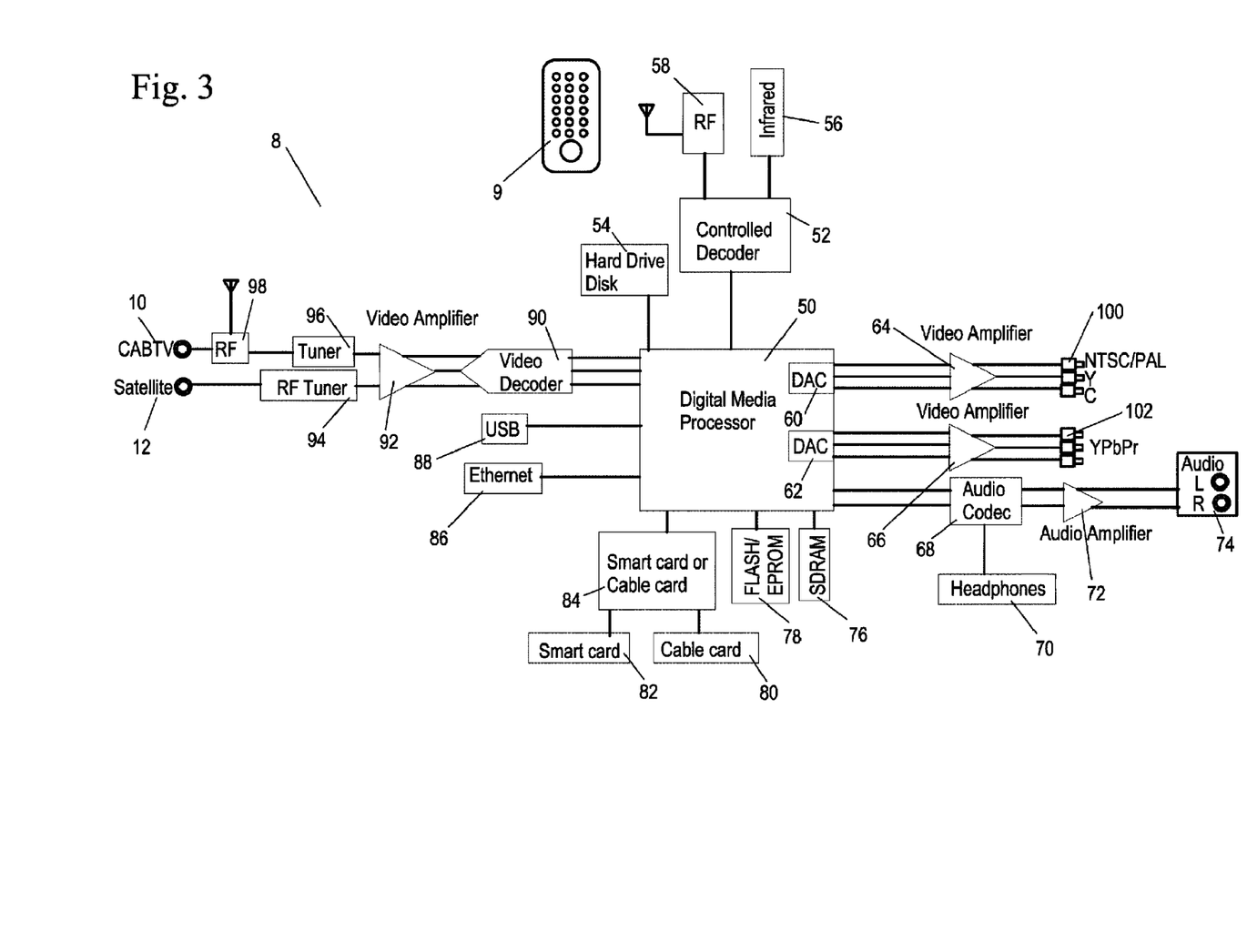
FIG. 3 shows a block diagram of a digital video recorder (DVR) in which illustrative embodiments may be implemented.

FIG. 3 shows an exemplary diagram of a video recorder, in particular a digital video recorder (DVR) 8 provided in which illustrative embodiments may be implemented. It should be appreciated that FIG. 3 is only exemplary and are not intended to assert or imply any limitation with regard to different embodiments which may be implemented. Modifications to the video recorder may be made.

The video recorder 8 includes a computer that has a digital media processor 50 with at least one digital-to-analog converter 60 which is connected to a video amplifier 64 and has inputs 100 for phase alternate line (PAL)/National Television System Committee (NTSC), composite video Y and C. A second digital-to-analog converter 62 is preferably present in the digital media processor 50 and is connected to a video amplifier 66 and has inputs 102 for YPbPr or component video.

The digital media processor 50 is also connected to an audio codec 68 for encoding analog audio as digital signals and decoding digital signals to analog signals. The audio codec 68 is connected to headphones 70 and an audio amplifier 72 for audio left L and right R outputs 74.

The video recorder 8 also has hard drive disk or storage 54 as well as flash or erasable programmable read only memory (EPROM) 78 and synchronous dynamic random access memory (SDRAM) 76 enabling a user to store TV broadcasts of their choosing.

An input 84 for a smart card 82 or cable card 80 may be present with the DVR 8 for users who need to decode an encrypted digital cable signal without using a set-top box.

The video recorder 8 has at least one tuner 96, and preferably has at least two tuners 94, 96. Tuner 96 is connected to receive an input for cable television 10 or to receive a broadcast signal through a radio frequency (RF) antenna 98. Tuner 96 is connected to a video amplifier 92, which in turn is connected to a video decoder 90 that sends a signal to the digital media processor 50. The second tuner 94 is connected to an input 12 for satellite and the video amplifier 92. From the video amplifier 92, a signal goes through a video decoder 90 and is then sent to the digital media processor 50. The digital media processor 50 is also has a port to connect to the Ethernet 86 or to another device through a universal serial bus (USB) port 88.

The digital media processor 50 of the video recorder 8 may be controlled by a universal remote 9 that communicates with a controlled decoder 52 coupled to the digital media processor 50 through infrared 56 or radio frequency (RF) signals 58.

The present invention is a method and a system for retrieving different versions of a recording or broadcast, for example a lower quality broadcast or a higher quality broadcast of a program based on currently recorded programs or programs scheduled for recording and user preferences. The user preferences define if and how a video recording device should attempt to replace recorded or scheduled programs. The method and system also allows the user to define global preferences which enable the video recorder to replace all programs, or only replace programs if certain conditions are met, such as low disk space. Additionally, the video recorder 8 can scan for alternate versions of a program before the program is recorded and based on a program specific preference or a global preference, instructs the video recorder 8 to look for alternate versions of the program before recording and invokes, if certain parameters are met, recording an alternate version of the program instead of the originally scheduled program. If an alternate version of the program is available, the user may be notified to decide what action to take.

Another embodiment of the present invention enables via automatic content replacement, a user to select and program any listing for recording, regardless of whether a station is broadcasting in a lower quality broadcast or a higher quality broadcast. The user may select the first listing seen for recording and let the video recorder 8 search for the preferred version of the program and the method aids in eliminating a problem of a user accidentally recording a lower quality broadcast, when a higher quality broadcast of the program is preferred. Plus, offering replacement of higher quality broadcast programs with lower quality broadcast versions of the same program enables a user to keep versions of recorded programs that would otherwise be deleted as available space decreases.

Figure 4:
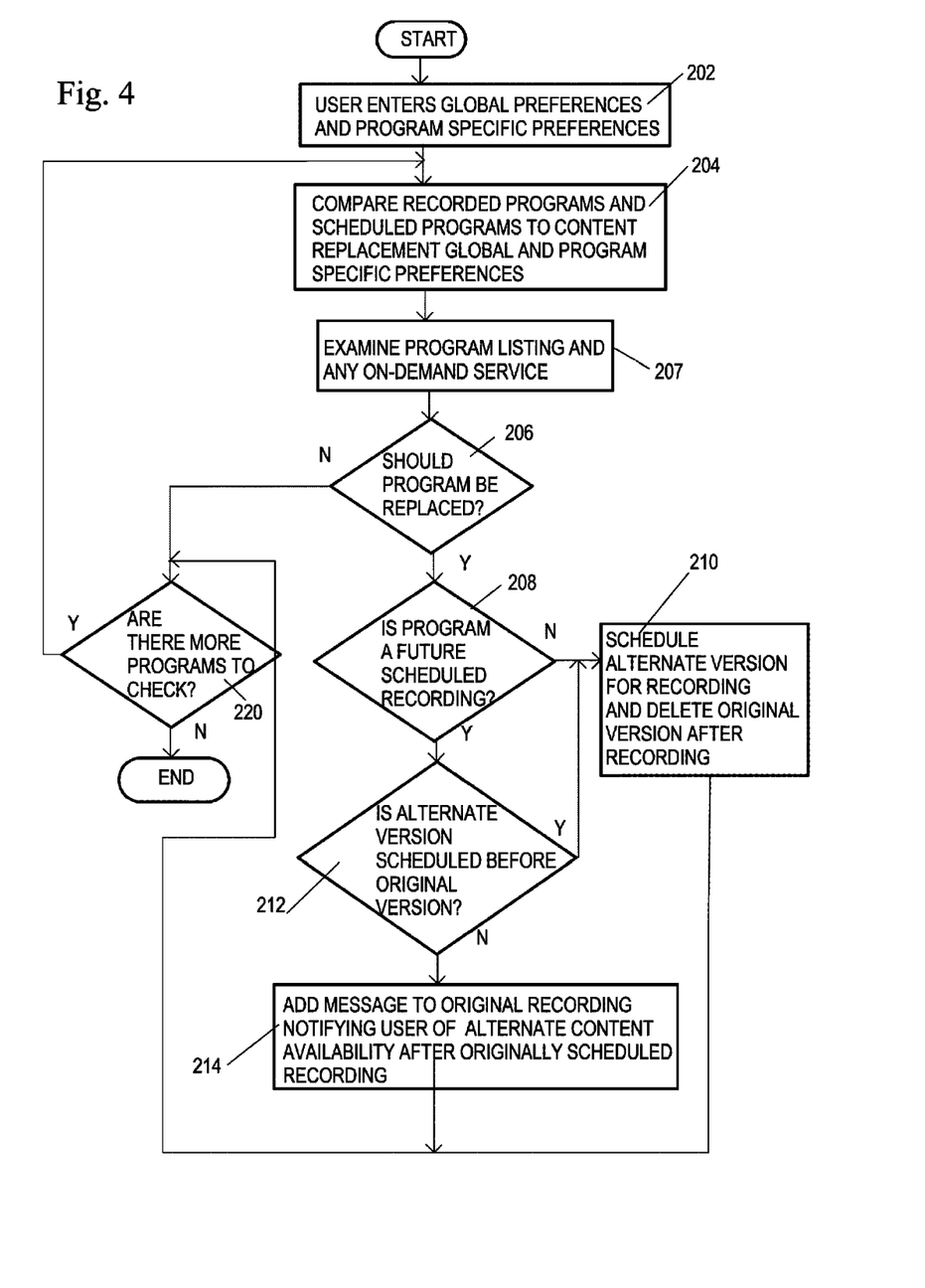
FIG. 4 shows steps for program content replacement for programs to be recorded and for programs that have already been recorded.

FIG. 4 shows steps for program content replacement of programs to be recorded and that have already been recorded. In a first step, the user enters global preferences and any program specific preferences through an interface of the video recorder 8 (step 202). A global preference applies to all recordings or scheduled recordings and may specify that all programs are preferred as a lower quality broadcast or a higher quality broadcast. Global preferences define if and how a video recording device should attempt to replace recorded or scheduled programs. Global preferences also enable the video recorder to replace all programs as specified, or only replace programs if certain conditions are met, such as low disk space. Program specific preferences are preferences that are limited to only individual recordings of a program or all recordings of a single show. Specific preferences for genres or channels may also be set by the user. For example, if programming with an increased amount of camera movement and actions, such as sports programming, is considered to benefit greatly from high quality broadcasting techniques, then sports programming in general or a program from a specific channel dedicated to sports could be specified by the user to be recorded only in high quality broadcasting.

If a user does not set preferences themselves, aggregate weighted selections of all individuals may be used to decide which programs to downgrade. Any manual downgrade selections that are made by the user would be transmitted to an aggregation service and this data would be available for the video recorder. For example, if out of one hundred people when presented with a list of shows, ninety chose the news in which to downgrade to a lower quality broadcast, then the video recorder 8 would apply this preference to the programs of the user.

Then, the video recorder 8 compares the recorded programs and scheduled programs to the contents of the global and program specific preferences (step 204). Once the comparison of the recorded programs and scheduled programs to the global and program specific preferences is complete, for each scheduled program whose quality does not match the global preferences and/or program specific preferences in step 204, the video recorder 8 examines a program listing and any on-demand service for the programs for alternate versions of the programs that did not match the global and program specific preferences and should be recorded in a higher quality broadcast or a lower quality broadcast (step 207). In other words, the video recorder effectively looks for the alternate versions of the same program that meets the global preference specified by the user, e.g. recording the program as a lower quality broadcast or a higher quality broadcast.

If a program does not need to be replaced (step 206), and there are no more programs to check (step 220), then the method ends. If there are additional programs to check (step 220), return to step 204 of comparing recorded programs and scheduled programs to contents of the global and program specific preferences.

If a program should be replaced (step 206) based on the global and/or program specific preferences (step 204) and examination of the program listing or broadcast programming and any on-demand service (step 207), then the video recorder 8 determines in step 208 whether the alternate version of the program is a future scheduled program. If the alternate version of the program is not a future scheduled recording, then the video recorder 8 schedules an alternate version of the program for recording and deletes the original version or the program after recording in step 210. If there are additional programs to check (step 220), return to step 204 of comparing recording recorded programs and scheduled programs to contents of the global and program specific preferences.

If the alternate version of the program is a future scheduled program (step 208), the video recorder 8 determines whether an alternate version of the program is scheduled before the original version of the program to be recorded in step 212. If the video recorder 8 determines that alternate version of the program is not scheduled before the original version of the program (step 212), then a message is added to the original recording notifying the user of alternate content availability after the originally scheduled recording is available (step 214). If there are no more programs to check (step 220), then the method ends. If there are additional programs to check (step 220), return to step 204 of comparing recording recorded programs and scheduled programs to the contents of the global and program specific preferences.

If the video recorder 8 determines that an alternate version of the program is scheduled before the original version of the program is to be aired and recorded in step 212, then the video recorder schedules a recording of the alternate version of the program and deletes the original scheduled recording in step 210. If there are additional programs to check (step 220), return to step 204 of comparing recording recorded programs and scheduled programs to the contents of the global and program specific preferences. If there are no additional programs to check (step 220), then the method ends.

If the alternate version of the program is available as an "on demand" selection, the program is downloaded or recorded by the video recorder 8 and the original version of the program is deleted during step 210 of scheduling an alternate version of the program for recording.

In an alternate embodiment, the video recorder may prevent recording of a high quality broadcast if it is determined that the display device or television being used for displaying the program does not support the higher quality broadcast. Detection of the display devices capability may occur through detection of which outputs the television or display device is connected to. In another embodiment, the display device and the video recorder may communicate either in band or out of band and exchange capabilities. "In band" refers to sending communications within a channel, or within a digital video recorder. "Out of band" refers to sending communications on a frequency band that is unrelated to frequencies that carry video and are not correlated to any specific channel. Alternatively, the video recorder may specify the display device make and model and through an Internet service, the video recorder may download the capabilities of the display device. For example, if a program is available in both 1080p and 720p and the display device only supports 720p, but the user scheduled recording is in 1080p, the video recorder may substitute the scheduled recording with a 720p version available on a separate channel or inform the user that the program must be recorded in a different quality broadcast.

Figure 5:
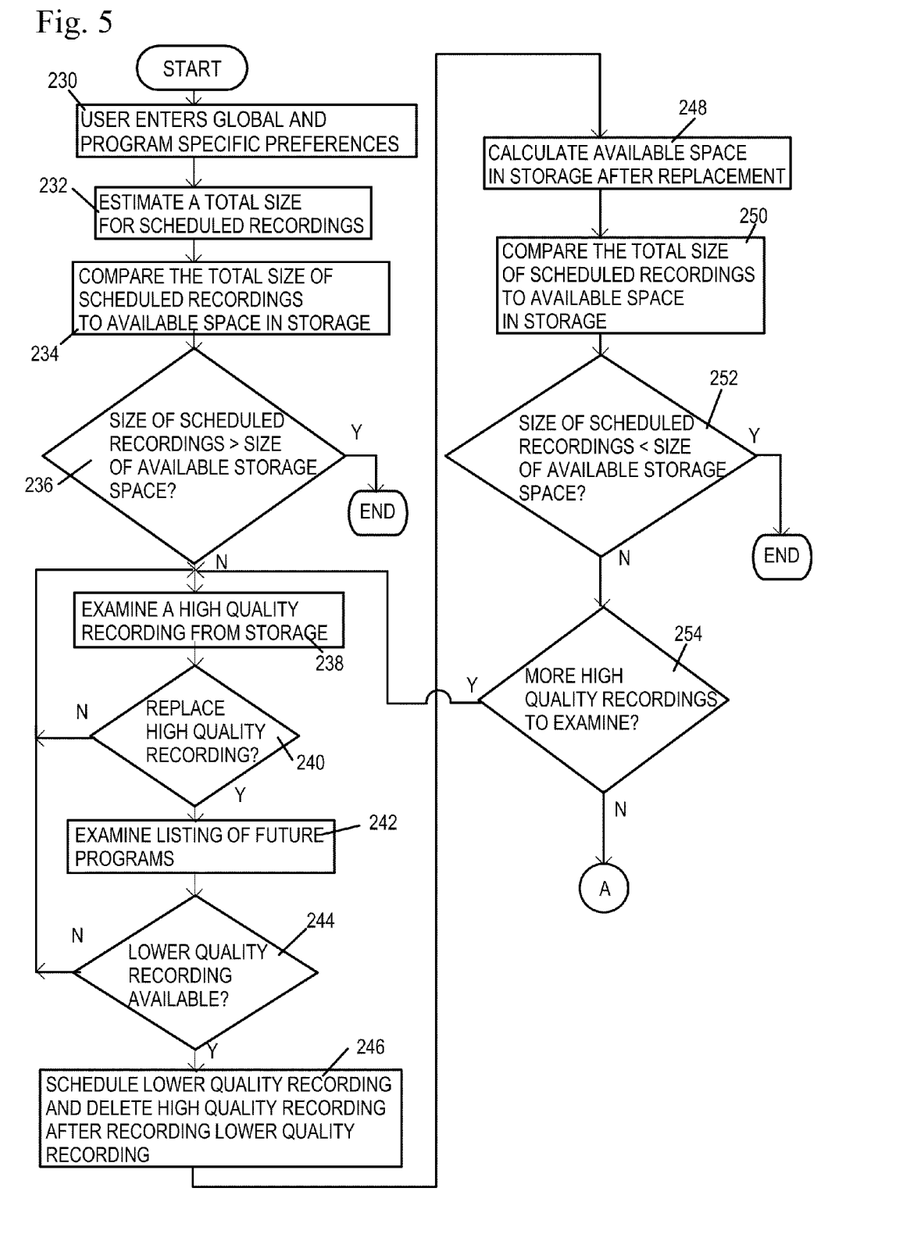
FIG. 5 shows steps for program content that has been recorded to be downgraded to a lower quality broadcast.

FIG. 5 shows another embodiment of the present invention in which disk space on the video recorder 8 is analyzed for space availability. In a first step, the user enters global preferences and any program specific preferences through an interface of the video recorder 8 (step 230). A global preference applies to all recordings or scheduled recordings and may specify that all programs are preferred in a lower quality broadcast or a higher quality broadcast. Global preferences define if and how a video recording device should attempt to replace recorded or scheduled programs. Global preferences also enable the video recorder to replace all programs as specified, or only replace programs if certain conditions are met, such as low disk space. Program specific preferences are preferences that are limited to only individual recordings of a program or all recordings of a single show. Specific preferences for genres or channels may also be set by the user. For example, if programming with an increased amount of camera movement and actions, such as sports programming, is considered to benefit greatly from high quality broadcasting techniques, then sports programming in general or from a specific channel dedicated to sports could be specified by the user to be recorded only in high quality broadcasting. It should be noted that a user may specify within program specific preferences whether a particular program may or may not be replaced with a lower quality broadcast version to open up storage space for future high quality broadcast recordings.

If a user does not set preferences themselves, aggregate weighted selections of all individuals may be used to decide which programs to downgrade. Any manual downgrade selections that are made by the user would be transmitted to an aggregation service and this data would be available for the video recorder 8. For example, if out of one hundred people when presented with a list of shows, ninety chose the news in which to downgrade to a lower quality broadcast, then the video recorder 8 would apply this preference to the programs of the user.

Next, the video recorder 8 estimates a total size of the scheduled recordings for a specific and determined time period in step 232. Then the total size of the scheduled recordings is compared to the available space in storage of the video recorder 8 in step 234.

If the total size of the scheduled recordings is greater than the size of the available space in the storage of the video recorder to record all of the scheduled programs for a specific time frame in step 236, then the method ends. If there is not enough available space in the storage of the video recorder to record all of the scheduled program recordings for a determined time frame in step 236, then the video recorder examines a high quality recording from storage of the video recorder 8 in step 238.

If the high quality recording being examined may not be replaced based on global and program specific preferences (step 240), return to step 238 and examine another high quality recording from storage of the video recorder.

If the high quality recording being examined may be replaced based on global and program specific preferences (step 240), examine a listing of future programs in step 242. If a lower quality broadcast is available for recording (step 244), schedule the lower quality broadcast for recording and delete the high quality recording after recording the lower quality recording in step 246.

After the lower quality broadcast has been recorded and the high quality broadcast recording has been deleted, calculate the available space in storage of the video recorder (step 248). Compare the total size of the scheduled recording to the available space in storage of the video recorder (step 250). If the size of the scheduled recordings is less than the size of the available storage space on the video recorder (step 252), then the method ends.

If the size of the scheduled recordings is greater than the size of the available storage space in step 252 and there are more high quality broadcast recordings to check (step 254), then return to step 238 of examining a high quality recording from storage of the video recorder. If the size of the scheduled recordings is greater than the size of the available storage space in step 252 and there are not more high quality broadcast recordings to check (step 254), then proceed to point A to check to see whether any of the scheduled high quality broadcasts may be changed.

Figure 6:
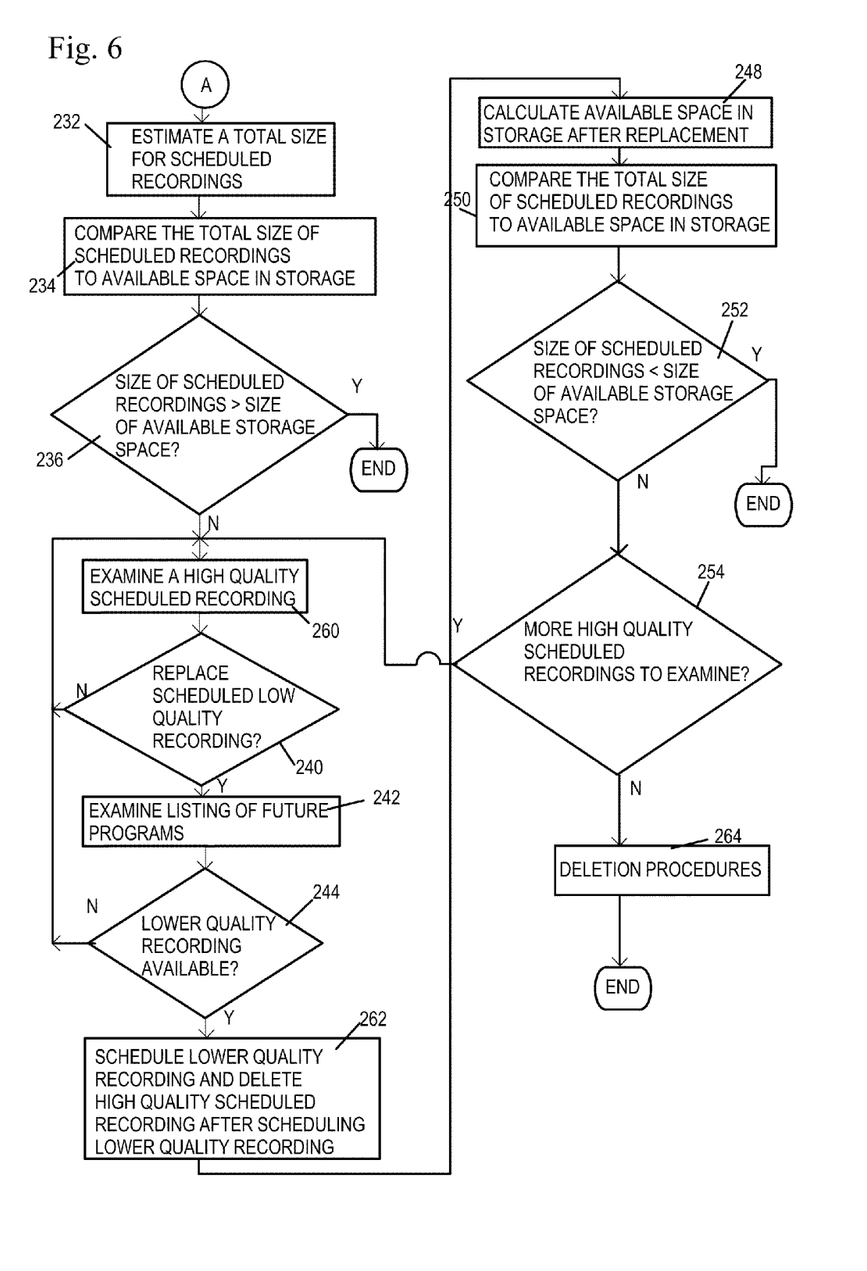
FIG. 6 shows steps for program content that has been scheduled to be recorded to be downgraded to a lower quality broadcast.

Referring to FIG. 6, the video recorder 8 estimates a total size of the scheduled recordings for a specific and determined time period in step 232. Then the total size of the scheduled recordings is compared to the available space in storage of the video recorder 8 in step 234.

If the total size of the scheduled recordings is greater than the size of the available space in the storage of the video recorder to record all of the scheduled programs for a specific time frame in step 236, then the method ends. If there is not enough available space in the storage of the video recorder to record all of the scheduled program recordings for a determined time frame in step 236, then the video recorder examines a high quality recording from storage of the video recorder 8 in step 260.

If the high quality scheduled recording being examined may not be replaced based on global and program specific preferences in step 240, return to step 260 and examine another high quality scheduled recording from storage of the video recorder.

If the high quality scheduled recording being examined may be replaced based on global and program specific preferences in step 240, examine a listing of future programs (step 242). If a lower quality broadcast is available for recording in step 244, schedule the lower quality broadcast for recording and delete the high quality scheduled recording after recording the lower quality recording in step 262.

After the lower quality broadcast has been recorded and the high quality scheduled recording has been deleted in step 262, calculate the available space in storage of the video recorder in step 248. Compare the total size of the scheduled recording to the available space in storage of the video recorder (step 250). If the size of the scheduled recordings is less than the size of the available storage space on the video recorder in step 252, then the method ends.

If the size of the scheduled recordings is greater than the size of the available storage space in step 252 and there are more high quality scheduled recordings to check in step 254, then return to step 260 of examining a high quality scheduled recording from storage of the video recorder. If the size of the scheduled recordings is greater than the size of the available storage space in step 252 and there are not more high quality scheduled recordings to check in step 254, then deletion procedures are carried out (step 264). Deletion procedures may include, but are not limited to deleting programs based on age or programs already watched by the user. After deletion procedures (step 264), the method ends.

Furthermore, when attempting to save space in the storage of the video recorder, only part of a programming may be re-recorded. For example, commercials may be re-recorded in a lower quality broadcast format using known commercial detection methods. Similarly, the open credits and end credits may also be re-recorded in a lower quality broadcast format.

In an alternate embodiment, the video recorder may prevent recording of a high quality broadcast if it is determined that the display device or television being used for displaying the program does not support the higher quality broadcast. Detection of the display devices capability may occur through detection of which outputs the television or display device is connected to. In another embodiment, the display device and the video recorder may communicate either in band or out of band and exchange capabilities. "In band" refers to sending communications within a channel, or within a digital video recorder. "Out of band" refers to sending communications on a frequency band that is unrelated to frequencies that carry video and are not correlated to any specific channel. Alternatively, the video recorder may specify the display device make and model and through an Internet service, the video recorder may download the capabilities of the display device. For example, if a program is available in both 1080p and 720p and the display device only supports 720p, but the user scheduled recording is in 1080p, the video recorder may substitute the scheduled recording with a 720p version available on a separate channel or inform the user that the program must be recorded in a different quality broadcast.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for program content replacement of programs to be recorded and programs that have already been recorded on a video recorder including a computer and a computer readable storage media comprising:
   a) estimating, by a processor of the computer, a total size for scheduled recordings;

b) comparing, by the processor of the computer, the total size of scheduled recordings to available space on the computer readable storage media;
c) if the total size of the scheduled recordings is greater than the available space on the computer readable storage media, then
   i) examining, by the processor of the computer, a high quality recording in the readable storage media, to determine, by the processor of the computer, whether the high quality recording may be replaced by a lower quality recording based on stored preferences;
   ii) if the high quality recording may be replaced based on the stored preferences, examining, by the processor of the computer, a listing of future programs for lower quality versions of the program; and
   iii) if a lower quality version of the program is available, scheduling, by the processor of the computer, the lower quality version for recording; and deleting the higher quality broadcast recording when the lower quality version has been recorded;
   iv) calculating, by the processor of the computer, available space after replacement of the high quality recording with the lower quality version;
   v) comparing, by the processor of the computer, the total size of scheduled recordings to available space on the computer readable storage media;
   vi) repeating steps (c)(i) to (c)(vi) until all the high quality recordings have been examined, or the total size of the scheduled recordings is less than the available space.

2. The method of claim 1, further comprising receiving user global preferences and program specific preferences into an interface of the video recorder.

3. The method of claim 1, wherein if global preferences and program specific preferences are absent, the global preferences and program specific preferences are replaced by aggregate global preferences and program specific preferences.

4. The method of claim 1, further comprising:
d) if after all the high quality recordings have been examined and the total size of the scheduled recordings is greater than the available space, then
   i) estimating, by the processor of the computer, a total size for scheduled recordings;
   ii) comparing, by the processor of the computer, the total size of scheduled recordings to available space on the computer readable storage media;
e) if the total size of the scheduled recordings is greater than the available space on the computer readable storage media, then
   i) examining, by the processor of the computer, a high quality scheduled recording in the computer readable storage media, to determine whether the high quality scheduled recording may be replaced by a lower quality scheduled recording based on stored preferences;
   ii) if the high quality scheduled recording may be replaced based on the stored preferences, examining, by the processor of the computer, a listing of future programs for lower quality versions of the program; and
   iii) if a lower quality version of the program is available, scheduling, by the processor of the computer, the lower quality version for recording; and deleting, by the processor of the computer, the higher quality scheduled recording when the lower quality version has been recorded;
   iv) calculating, by the processor of the computer, available space after replacement of the high quality scheduled recording with the lower quality version;
   v) comparing, by the processor of the computer, the total size of scheduled recordings to available space on the computer readable storage media;
   vi) repeating steps (e)(i) to (e)(v) until all the high quality scheduled recordings have been examined, or the total size of the scheduled recordings is less than the available space.

5. The method of claim 4, wherein after all the high quality recordings have been examined and the total size of the scheduled recordings is greater than the available space, further comprising deleting, by the processor of the computer, high quality recording in the computer readable storage media based on age.

6. A video recorder system for content replacement of programs to be recorded and have already been recorded comprising:
a video recorder comprising a computer and a computer a readable storage media coupled to a broadcasting network;
first program instructions to estimate a total size for scheduled recordings;
second program instructions to compare the total size of scheduled recordings to available space on the computer readable storage media;
third program instructions of if the total size of the scheduled recordings is greater than the available space on the computer readable storage media, then
   examining a high quality recording in the computer readable storage media, to determine whether the high quality recording may be replaced by a lower quality recording based on stored preferences;
   if the high quality recording may be replaced based on the stored preferences, examining a listing of future programs for lower quality versions of the program; and
   if a lower quality version of the program is available, scheduling the lower quality version for recording; and deleting the higher quality broadcast recording when the lower quality version has been recorded;
   calculating available space after replacement of the high quality recording with the lower quality version;
   comparing the total size of scheduled recordings to available space on the computer readable storage media;
   repeat from examining a high quality recording, until the first of all the high quality recordings have been examined, or the total size of the scheduled recordings is less than the available space
wherein the first, second, and third program instructions are stored on the computer readable storage media.

7. The system of claim 6, further comprising program instructions to receive user global preferences and program specific preferences into an interface of the video recorder, wherein the program instructions are stored on the computer readable storage media.

8. The system of claim 6, wherein if global preferences and program specific preferences are absent, the global preferences and program specific preferences are replaced by aggregate global preferences and program specific preferences.

9. The system of claim 6, wherein after all the high quality recordings have been examined and the total size of the scheduled recordings is greater than the available space, further comprising:

fourth program instructions to estimate a total size for scheduled recordings;

fifth program instructions to compare the total size of scheduled recordings to available space on the computer readable storage media;

sixth program instructions of if the total size of the scheduled recordings is greater than the available space on the computer readable storage media, then     examining a high quality scheduled recording in the computer readable storage media, to determine whether the high quality scheduled recording may be replaced by a lower quality scheduled recording based on stored preferences;

if the high quality scheduled recording may be replaced based on the stored preferences, examining a listing of future programs for lower quality versions of the program; and         if a lower quality version of the program is available, scheduling the lower quality version for recording; and deleting the higher quality scheduled recording when the lower quality version has been recorded;

calculating available space after replacement of the high quality scheduled recording with the lower quality version;

comparing the total size of scheduled recordings to available space on the computer readable storage media;

repeat from examining a high quality scheduled recording, until the first of all the high quality scheduled recordings have been examined, or the total size of the scheduled recordings is less than the available space wherein the fourth, fifth, and sixth program instructions are stored on the computer readable storage media.

10. The system of claim 9, wherein after all the high quality recordings have been examined and the total size of the scheduled recordings is greater than the available space, further comprising seventh program instructions to delete high quality recording in the computer readable storage media based on age, wherein the seventh program instructions is stored on the computer readable storage media.

\* \* \* \* \*